UNITED STATES PATENT OFFICE.

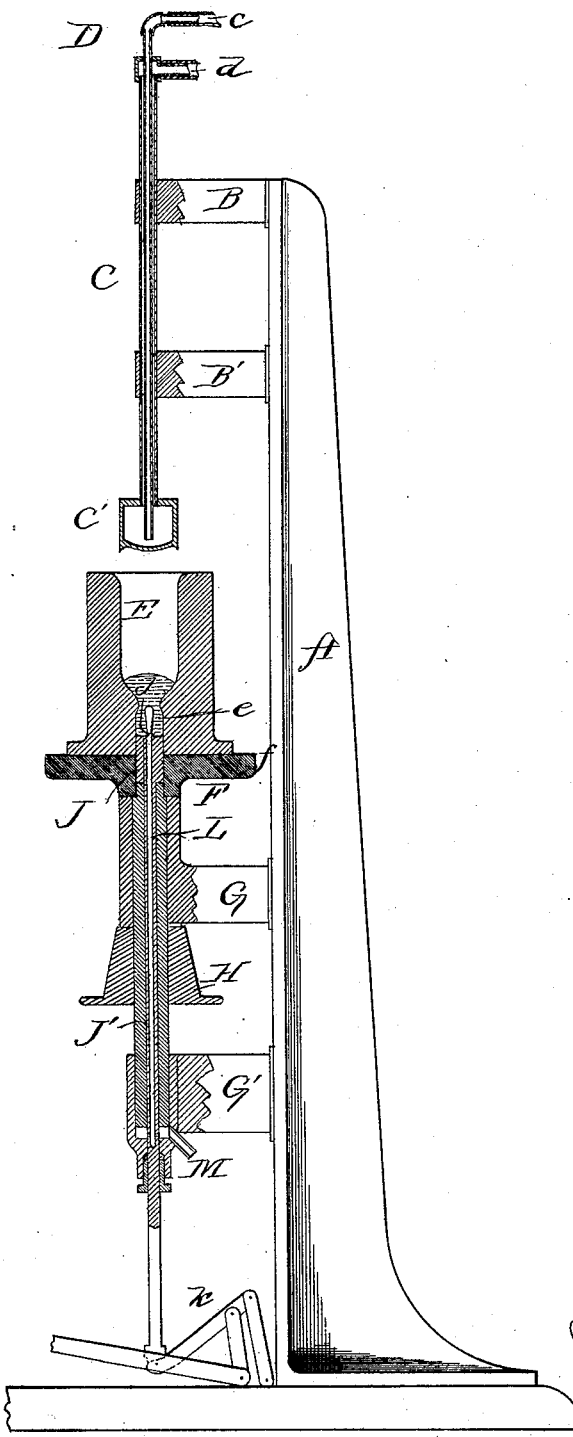

JOSEPH BOYER, OF ST. LOUIS, MISSOURI.

APPARATUS FOR MAKING GLASS BOTTLES.

SPECIFICATION forming part of Letters Patent No. 428,712, dated May 27, 1890.

Application filed August 13, 1888. Serial No. 282,639. (No model.)

*To all whom it may concern:*

Be it known that I, JOSEPH BOYER, a citizen of the United States, residing at St. Louis, in the State of Missouri, have invented certain new and useful Improvements in Apparatus for Making Glass Bottles; and I do hereby declare the following to be a full, clear, and exact description of the invention, which will enable others skilled in the art to which it appertains to make and use the same.

My present invention relates to an improved apparatus for making glass bottles, in the carrying out of which the process described in application, Serial No. 282,340, filed August 13, 1888, may be conveniently used.

The novelty in the apparatus about to be described consists, principally, of an inverted mold for the bottles, supported so as to be revolved, a plunger to enter said mold and by compression form the neck of the bottle, a hollow rod adapted to allow the passage of air under mechanical pressure into the neck of the bottle-bloom for the purpose of expanding it, and in various operative combinations of the several parts, as will be more fully explained.

For a better comprehension of my invention attention is invited to the accompanying drawing of the apparatus, in which is shown a side elevation, partly in section, of the same.

A represents any suitable frame-work, the one shown being a single column, having at near the top thereof arms B B', preferably adapted to swing back and forth. A plunger-tube C passes through these arms, and is adapted to slide up and down, and has at its lower end a plunger C', of any desired form to adapt it for the mold presently to be mentioned.

As it is desired to keep the plunger cool, it is preferably made hollow, and another tube D, loosely contained within the tube C and passing down into the cavity of the plunger, furnishes air by which the cold air or water can be forced down into the plunger through the tube D and ascend between such tube and the tube C. To the upper end of these tubes connections c and d may be attached. When swung properly in position, the plunger will be directly above the upper opening in the inverted mold E. This mold as represented in the drawing is for a soda-water bottle, and has the proper inside shape for the same, and is made in two parts in the usual way. This mold is open at the bottom e, and at that point has the form of the neck of a soda-water bottle. This mold stands upon any proper support F, (shown as a hollow standard,) having a flat top f, and adapted to turn in arms G G', secured to the frame-work A, and caused to turn by means of a pulley H. This standard contains a plunger J, having a rod J', which passes entirely through the standard, having its lower end connected with a foot-treadle k, by means of which the plunger may be raised, so as to expel the completed bottle from the mold.

A tube L is contained within the rod J' and has its upper end j extended up into the mold. This rod has by convenient means a limited movement up and down, and at its lower end is connected with a pipe M, which in turn connects with a reservoir, or any means of supply of air under pressure, which pressure is suitably governed by any proper valve, preferably, in such pipes.

The parts being in position, sufficient molten glass is dropped into the upper end of the mold, the plunger C' is caused to enter the mold and press the glass downward in the mold to form the neck of the bottle, at the same time the top of the tube L is pressed up into the neck of the bottle bloom, and withdrawn, leaves the neck open, and the current of compressed air is permitted to pass through the tube L and expand the bottle-bloom, forcing up the plunger C' until the bottle is complete. The mold is then partially opened, and the plunger J forces the completed bottle out.

In this description the essential parts of the apparatus may be made in a great variety of forms without departing from the spirit of my invention, and gases under pressure, including steam, may be used for expanding the bottle-bloom. It will also be understood that the term "bottle" as used in this specification is intended to include any variety of ware which can be made by the apparatus in the way indicated. It will also be understood that the plunger C' need not swing, but it preferably should swing, and also that the tube L need not necessarily be pressed up into the necks of the blooms, but preferably it should be pressed, and the air may escape through the end $j$ by a single or by many perforations, or the whole head may be covered by a valve.

Having now described my invention, what I claim as new therein, and desire to secure by Letters Patent, is as follows:

1. An apparatus for making bottles, having an inverted mold, rotating support for the same, a plunger to enter the larger end of said mold, and an air-tube to enter the smaller end of said mold, as and for the purpose described.

2. An apparatus for making bottles, having a rotating sectional mold, and a plunger to enter the larger end of said mold, as and for the purposes set forth.

3. An apparatus for making bottles having a rotating sectional mold, and a plunger, having a hollow chamber therein, to enter the larger end of said mold, as and for the purposes set forth.

In testimony whereof I affix my signature in presence of two witnesses.

JOSEPH BOYER.

Witnesses:
E. H. BERRY,
L. H. DYER.